(12) United States Patent
Okamoto et al.

(10) Patent No.: US 8,454,170 B2
(45) Date of Patent: Jun. 4, 2013

(54) PROJECTOR AND METHOD FOR COOLING LAMPS INSTALLED IN PROJECTOR

(75) Inventors: Koji Okamoto, Kanagawa (JP); Kohei Kabuki, Kanagawa (JP)

(73) Assignee: Sony Corporation, Tokyo (JP)

( * ) Notice: Subject to any disclaimer, the term of this patent is extended or adjusted under 35 U.S.C. 154(b) by 273 days.

(21) Appl. No.: 12/976,438

(22) Filed: Dec. 22, 2010

(65) Prior Publication Data

US 2011/0157562 A1 Jun. 30, 2011

(30) Foreign Application Priority Data

Dec. 28, 2009 (JP) ................................ P2009-298941

(51) Int. Cl.
*G03B 21/18* (2006.01)
*F21V 29/00* (2006.01)

(52) U.S. Cl.
USPC ................. 353/61; 353/57; 353/60; 353/121; 362/294; 362/373

(58) Field of Classification Search
USPC .................. 353/61, 57, 52, 60, 121; 362/294, 362/373
See application file for complete search history.

(56) References Cited

U.S. PATENT DOCUMENTS 4,682,868 A * 7/1987 Constantin et al. ............. 353/58
2008/0198336 A1* 8/2008 Chen et al. ...................... 353/58

FOREIGN PATENT DOCUMENTS

| CN | 101285996 | 10/2008 |
| JP | 2007 108625 | 4/2007 |

* cited by examiner

*Primary Examiner* — Georgia Y Epps
*Assistant Examiner* — Magda Cruz
(74) *Attorney, Agent, or Firm* — Frommer Lawrence & Haug LLP; William S. Frommer (57) ABSTRACT

A projector includes a plurality of lamps serving as light sources, the lamps being arranged next to each other, and a single exhaust fan disposed adjacent to the lamps, the exhaust fan discharging air around the lamps.

4 Claims, 6 Drawing Sheets

PROJECTOR AND METHOD FOR COOLING LAMPS INSTALLED IN PROJECTOR

BACKGROUND OF THE INVENTION

1. Field of the Invention

The present invention relates to a projector and a method for cooling lamps installed in the projector.

2. Description of the Related Art

A projector is a display apparatus for projecting an image, and includes a high-intensity lamp as a light source. Light is caused to pass through, for example, liquid crystal panels and is emitted toward a screen or the like. A so-called two-lamp projector is an example of a projector according to the related art which includes two lamps. There are two types of two-lamp projectors: two-lamp projectors in which two lamps are simultaneously turned on to increase the brightness and two-lamp projectors in which only one of the two lamps is normally turned on and the other lamp is stored as an auxiliary lamp.

The lamps mounted in the projectors emit heat when the lamps are turned on. Therefore, the temperature of the lamps and the inner spaces of the projectors increases. Accordingly, the projectors are provided with cooling systems including air supply fans and exhaust fans to cool the lamps and the inner spaces of the projectors.

Japanese Unexamined Patent Application Publication No. 2007-108625 discloses a technique regarding a two-lamp projector, and describes the structure in which each of two lamps is provided with a single cooling fan.

SUMMARY OF THE INVENTION

Figure 5:
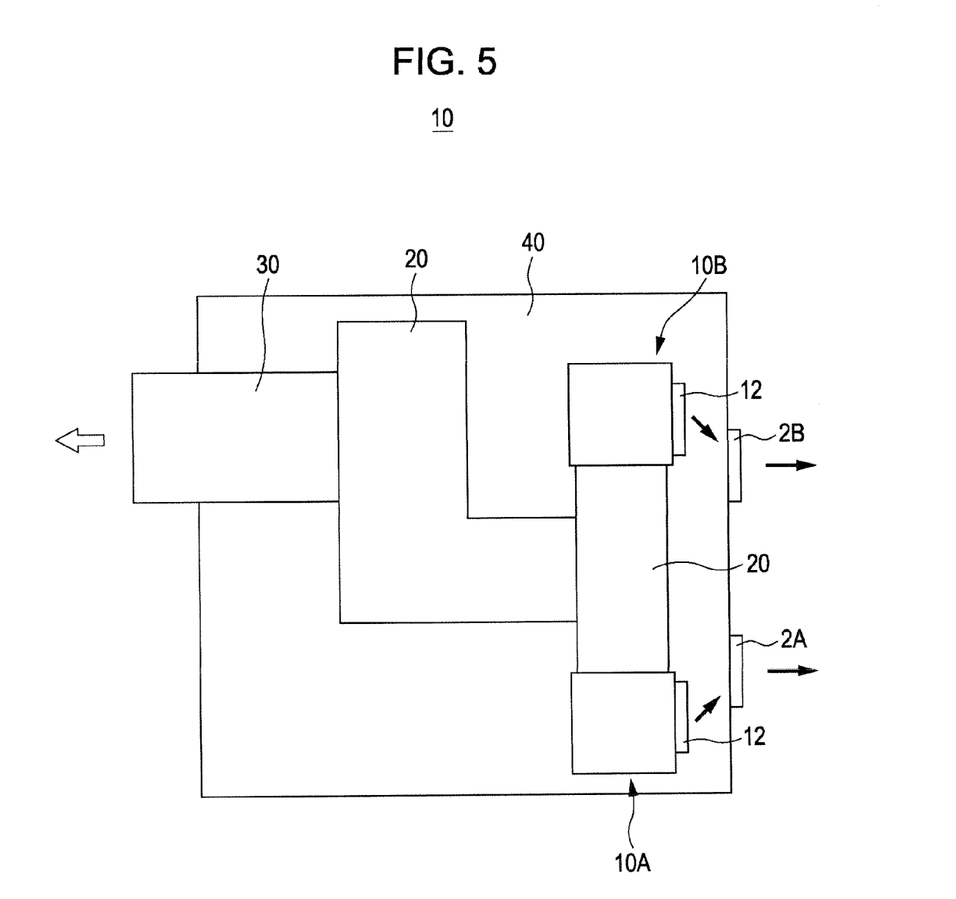
FIG. 5 is a plan view of a projector according to the related art.
Figure 6:
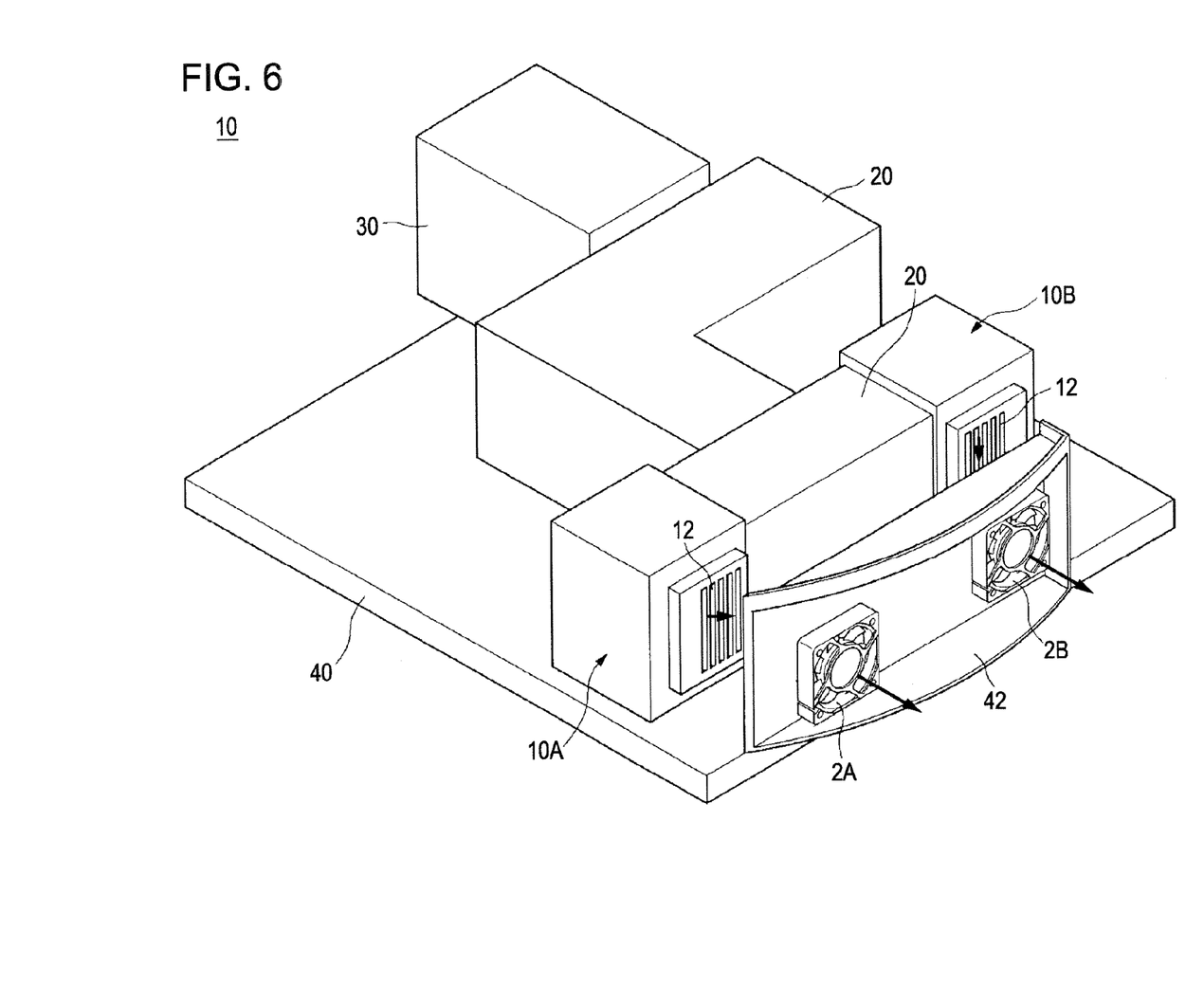
FIG. 6 is a perspective view of the projector according to the related art.

As illustrated in FIGS. 5 and 6, in a two-lamp projector according to the related art, lamps are disposed symmetrically to each other with an illumination optical system 20 disposed therebetween. FIG. 5 is a plan view of a projector 10 according to the related art. FIG. 6 is a perspective view of the projector 10 according to the related art. FIGS. 5 and 6 schematically illustrate the main components of the projector 10 that are installed on a base 40 and exhaust fans 2A and 2B in the state in which an external housing of the projector 10 is removed.

The projector 10 according to the related art includes lamp boxes 10A and 10B, the illumination optical system 20, a projection optical system 30, and the exhaust fans 2A and 2B. In the case where the projector 10 is of a two-lamp switching type, the projector 10 emits light from one of lamps mounted in the lamp boxes 10A and 10B. The lamps mounted in the lamp boxes 10A and 10B are arranged such that light emission directions thereof are opposed to each other. The light emitted from each lamp is divided into three light components corresponding to three primary colors (R, G, and B), and the thus-divided light components are caused to pass through liquid crystal panels and combined together in the illumination optical system 20. The light obtained by combining the light components in the illumination optical system 20 passes through the projection optical system 30 as an image. The image is projected onto a screen or the like from the projection optical system 30 in a direction shown by the arrow in FIG. 5.

In the projector 10 of the two-lamp switching type according to the related art, mirrors for switching between optical paths are disposed at a central position between the two lamp boxes 10A and 10B in the illumination optical system 20. The optical arrangement of the lamp boxes 10A and 10B and the illumination optical system 20 can be easily designed. However, since the two lamp boxes 10A and 10B are separated from each other, the overall size of the projector 10 is relatively large.

In addition, since the lamp boxes 10A and 10B are separated from each other, each of the lamp boxes 10A and 10B is provided with a cooling system for cooling the lamp contained therein. In particular, the exhaust fans 2A and 2B are arranged at positions corresponding to the positions of the lamp boxes 10A and 10B so that the air discharged from slits 12 of the lamp boxes 10A and 10B can be effectively discharged. As a result, at least two exhaust fans 2A and 2B are provided on an external housing 42 at positions near the lamp boxes 10A and 10B, and the exhaust fans 2A and 2B occupy a large space in the projector 10.

The temperature of the air discharged to the outside of the projector 10 is preferably low in consideration of the influence on the user and the external environment. However, in the projector 10 according to the related art, the distance from the lamp boxes 10A and 10B to the respective exhaust fans 2A and 2B is small. Therefore, it is difficult to reduce the temperature of the air discharged from the lamps that are turned on and that generate heat. As a result, the air is discharged to the outside of the projector 10 while the temperature thereof is relatively high. In addition, in the case where the operations of the exhaust fans 2A and 2B are not controlled in accordance with whether or not the lamps are turned on, when the lamps from which the air is discharged are not turned on, the exhaust fans 2A and 2B are uselessly operated even though no temperature change is caused.

In light of the above-described situation, it is desirable to provide a new and improved projector in which the space occupied by a cooling system for lamps can be reduced so that the overall size can be reduced and the design freedom can be increased. In addition, it is also desirable to provide a method for cooling the lamps installed in the projector.

According to an embodiment of the present invention, a projector includes a plurality of lamps serving as light sources, the lamps being arranged next to each other, and a single exhaust fan disposed adjacent to the lamps, the exhaust fan discharging air around the lamps.

The projector may further include a heat transfer member disposed at an air discharge side of the lamps, air discharged from at least one of the lamps that is turned on and air discharged from at least one of the lamps that is not turned on coming into contact with the heat transfer member so that temperatures of the air discharged from the at least one of the lamps that is turned on and the air discharged from the at least one of the lamps that is not turned on are changed.

The projector may further include box-shaped lamp boxes that accommodate the lamps. The lamp boxes may be provided with openings at the air discharge side of the lamps, the openings having side walls inclined toward the heat transfer member so that the air discharged from the lamps can easily flow toward the heat transfer member.

According to another embodiment of the present invention, a method for cooling a plurality of lamps installed in a projector in which only one of the lamps is turned on, the lamps serving as light sources and being arranged next to each other, includes the step of mixing and discharging air around the lamp that is turned on and air around at least one of the lamps that is not turned on with a single exhaust fan disposed adjacent to the lamps.

The method may further include the step of changing temperatures of air discharged from the lamp that is turned on and air discharged from the at least one of the lamps that is not turned on by bringing the air discharged from the lamp that is turned on and the air discharged from the at least one of the lamps that is not turned on into contact with a heat transfer member disposed at an air discharge side of the lamps.

According to another embodiment of the present invention, a method for cooling a plurality of lamps installed in a projector in which the lamps are turned on, the lamps serving as light sources and being arranged next to each other, includes the step of mixing and discharging air around each of the lamps that are turned on with a single exhaust fan disposed adjacent to the lamps.

As described above, according to the embodiments of the present invention, the space occupied by the cooling system for the lamps can be reduced. As a result, the overall size of the projector can be reduced and the design freedom can be increased.

DESCRIPTION OF THE PREFERRED EMBODIMENTS

An embodiment of the present invention will now be described in detail with reference to the accompanying drawings. In this specification and the drawings, components having substantially the same functions are denoted by the same reference numerals and redundant explanations thereof are thus omitted.

Figure 1:
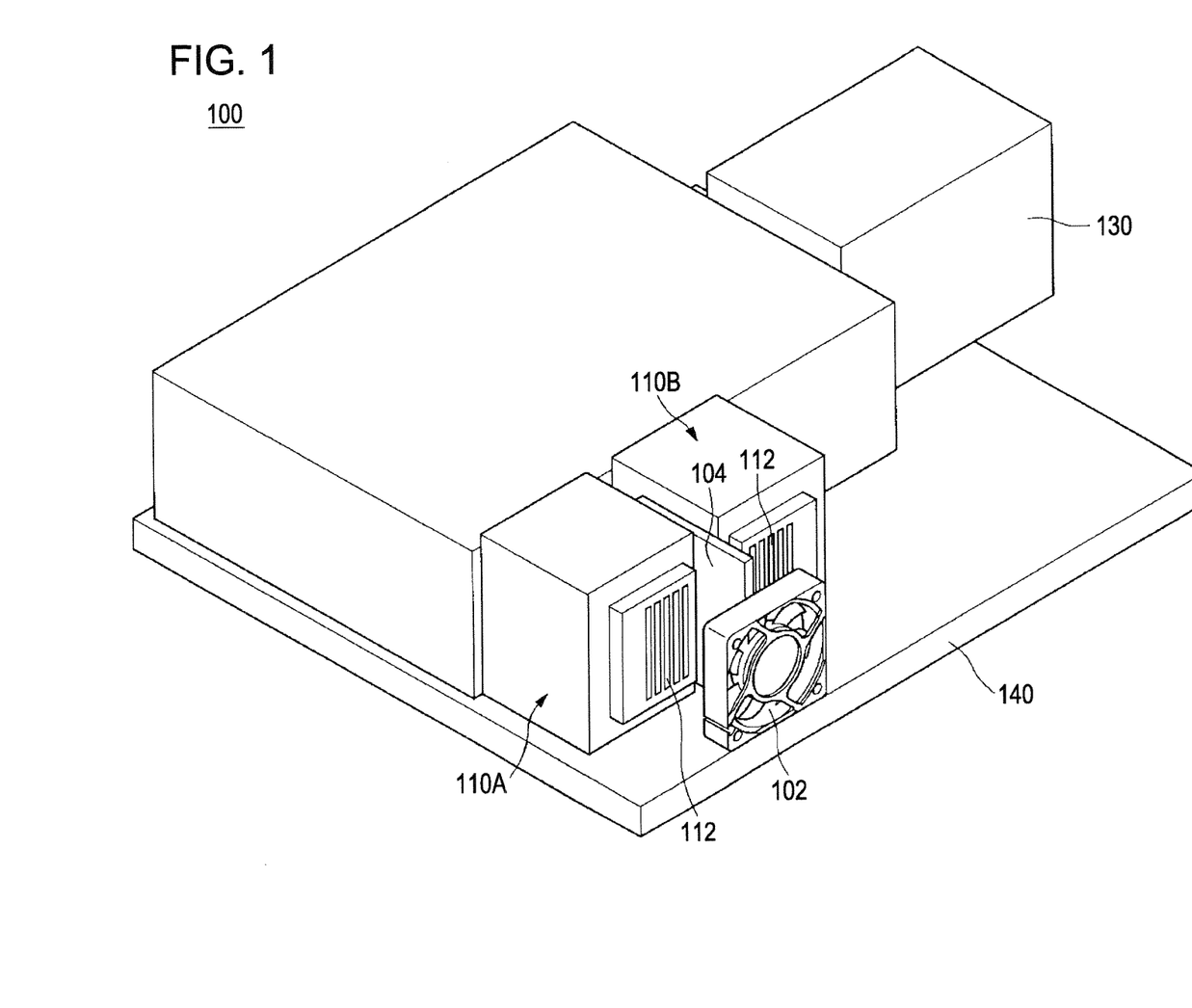
FIG. 1 is a perspective view of a projector according to an embodiment of the present invention.
Figure 2:
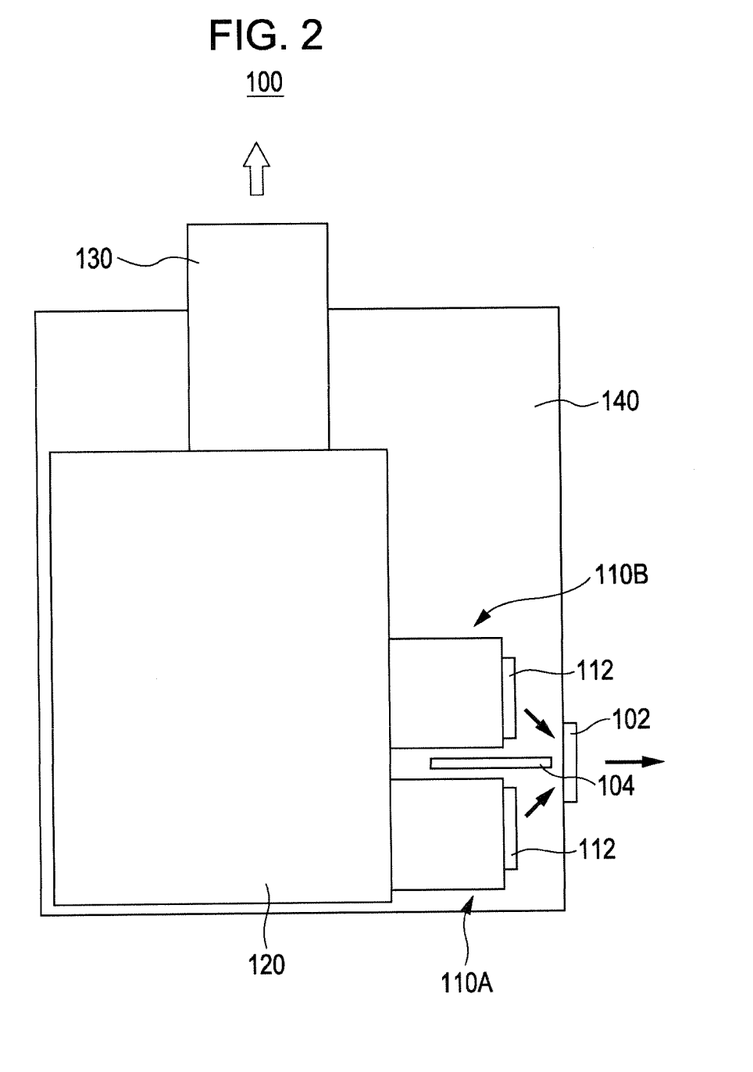
FIG. 2 is a plan view of the projector according to the embodiment.

The explanations will be made in the following order:
1. Structure of Embodiment
2. Operation of Embodiment 1. Structure of Embodiment First, the structure of a projector 100 according to an embodiment of the present invention will be described. FIG. 1 is a perspective view of the projector 100 according to the embodiment. FIG. 2 is a plan view of the projector 100 according to the embodiment. FIGS. 1 and 2 schematically illustrate the main components of the projector 100 that are installed on a base 140 and an exhaust fan 102 in the state in which an external housing of the projector 100 is removed.

The projector 100 according to the present embodiment includes lamp boxes 110A and 110B, an illumination optical system 120, a projection optical system 130, and the exhaust fan 102. The projector 100 is a display apparatus for projecting an image, and includes high-intensity lamps as light sources. Light is caused to pass through, for example, liquid crystal panels and is emitted toward a screen or the like.

The projector 100 is of a two-lamp switching type in which only one of two lamps is normally used and the other lamp is stored as an auxiliary lamp. Therefore, when the projector 100 is used, only one of the lamps that is turned on generates heat and the temperature thereof increases. The other lamp that is not turned on does not generate heat.

The lamp boxes 110A and 110E are box-shaped, and contain the lamps that serve as the light sources of the projector 100. The lamps may be, for example, xenon lamps or extrahigh-pressure mercury lamps. Light emitted from each lamp is output to the illumination optical system 120. Since the projector 100 is of the two-lamp switching type, when the projector 100 is used, one of the lamps in the lamp boxes 110A and 110B is turned on the basis of, for example, the selection of the user or settings in the projector 100.

Unlike the projector 10 according to the related art, the lamp boxes 110A and 110B are arranged parallel to each other such that the two lamps contained in the lamp boxes 110A and 110B emit light in the same direction in the projector 100. In addition, unlike the projector 10 according to the related art, the lamp boxes 110A and 110B are arranged next to each other.

Since the projector 100 is of the two-lamp switching type, the illumination optical system 120 includes mirrors for switching between an optical path for the light from the lamp in the lamp box 110A and an optical path for the light from the lamp in the lamp box 110B. Since the arrangement of the lamp boxes 110A and 110B is different from that in the projector 10 according to the related art, the arrangement of the mirrors for switching between the optical paths for the light from the lamps differs from that in the projector 10 according to the related art.

The illumination optical system 120 divides the light emitted from each lamp into three light components corresponding to three primary colors (R, G, and B). Then, the illumination optical system 120 causes the light components to pass through respective liquid crystal panels, so that image light components of the respective colors are generated. Then, the image light components are combined together into image light. The illumination optical system 120 outputs the combined image light to the projection optical system 130. The illumination optical system 120 includes a UV cut filter, fly-eye lenses, mirrors, lenses, liquid crystal panels, and a cross prism. The illumination optical system 120 may have a structure according to the relate art except for the arrangement of the mirrors for switching between the optical paths of the light from the lamps.

The projection optical system 130 includes, for example, a projecting lens, and projects the image light output from the illumination optical system 120 onto the screen or the like.

Cooling System of Projector 100

Figure 3A:
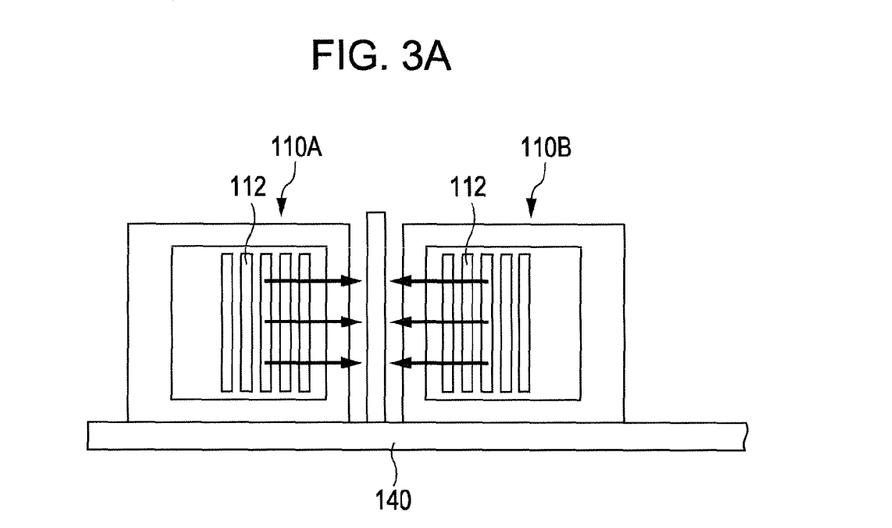
FIG. 3A is a side view of lamp boxes according to the embodiment.
Figure 3B:
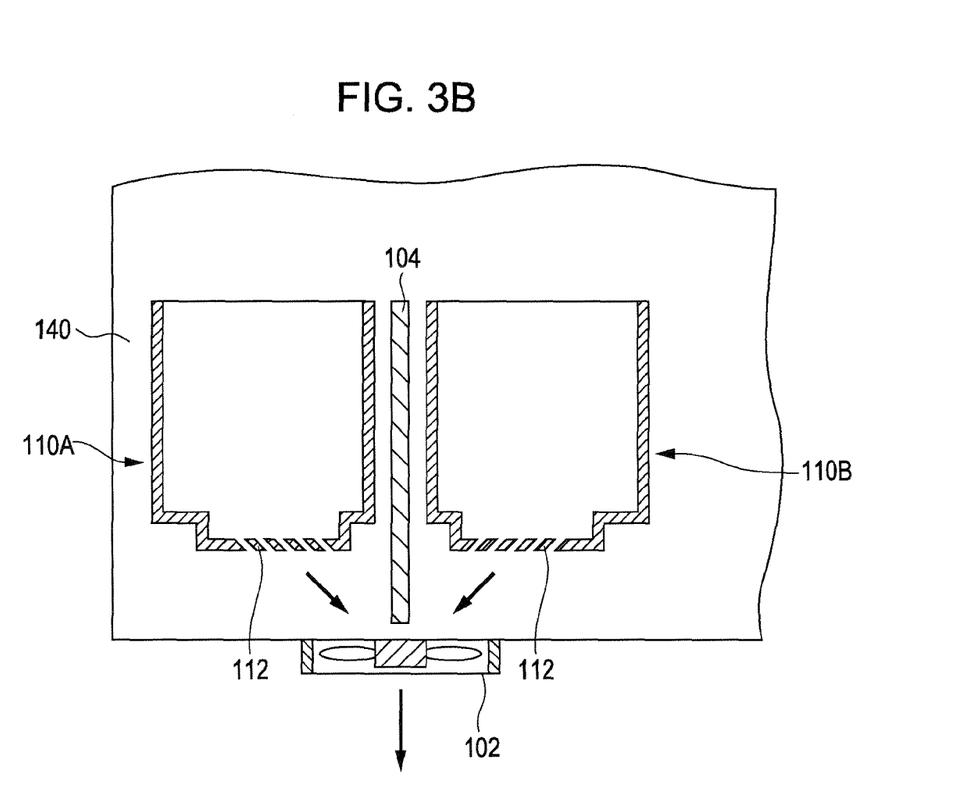
FIG. 3B is a horizontal sectional view of the lamp boxes according to the embodiment.
Figure 4:
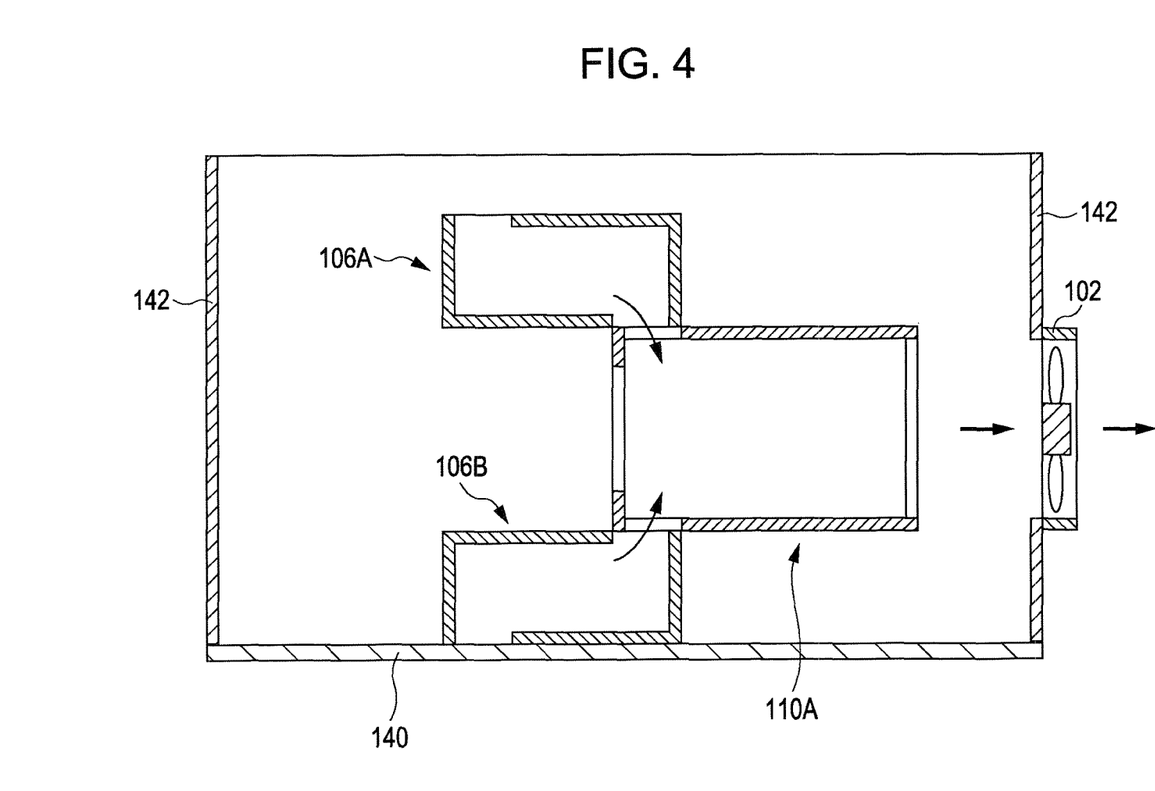
FIG. 4 is a vertical sectional view of air supply fans and one of the lamp boxes according to the embodiment.

A cooling system of the projector 100 will be described with reference to FIGS. 1 to 4. FIGS. 3A and 3B are a side view and a horizontal sectional view, respectively, of the lamp boxes 110A and 110B according to the present embodiment. FIG. 4 is a vertical sectional view of air supply fans 106A and 106B and the lamp box 110A according to the present embodiment.

The cooling system of the projector 100 includes, for example, the air supply fans 106A and 106B, the exhaust fan 102, and a heat transfer member 104.

The air supply fans 106A and 106B are, for example, centrifugal fans. The air supply fans 106A and 106B supply air to the lamps mounted in the lamp boxes 110A and 110B to cool the lamps that generate heat when the lamps are turned on. The air supply fans 106A and 106B are connected to, for example, the lamp box 110A (or 110B), as illustrated in FIG. 4.

The two air supply fans 106A and 106B are respectively provided at the upper side and the lower side, as illustrated in FIG. 4. Accordingly, the lamp can be cooled from the upper and lower sides thereof. Although not shown in FIG. 4, ducts may be provided so as to extend from the air supply fans 106A and 106B to the lamp boxes 110A and 110B, and cooling air may be supplied from the air supply fans 106A and 106B to the lamp boxes 110A and 110B through the ducts.

The exhaust fan 102 is, for example, an axial fan. The exhaust fan 102 sucks air supplied to the lamps in the lamp boxes 110A and 110B and discharges the air to the outside of the projector 100. The exhaust fan 102 is attached to, for example, an external housing 142 of the projector 100, as illustrated in FIG. 4.

A single exhaust fan 102 is disposed near the lamp boxes 110A and 110B. The exhaust fan 102 is disposed at a position where the distance from the exhaust fan 102 to the lamp box 110A is equal to the distance from the exhaust fan 102 to the lamp box 110B. Accordingly, the air can be evenly discharged from the lamp boxes 110A and 110B.

The exhaust fan 102 mixes the air from the lamp box 110A with the air from the lamp box 110B and discharges the mixed air. The exhaust fan 102 is disposed such that a gap is provided between the exhaust fan 102 and the lamp boxes 110A and 110B. Therefore, the air in the projector 100 other than the air in the lamp boxes 110A and 110B can also be discharged to the outside. Thus, the entire area of the projector 100 can be cooled by the exhaust fan 102.

The heat transfer member 104 is a plate-shaped member made of, for example, a metal having a high thermal conductivity. The heat transfer member 104 is disposed between the two lamp boxes 110A and 110B at the exhaust side thereof. As illustrated in FIGS. 3A and 3B, the air discharged from the lamp box 110A and the air discharged from the lamp box 110B come into contact with the heat transfer member 104.

The heat transfer member 104 has a heat dissipation property, and is therefore capable of reducing the temperature of the air emitted from the lamp that is turned on and that generates heat. Since the projector 100 is of the two-lamp switching type, high-temperature air comes into contact with the heat transfer member 104 from one of the lamps that is turned on and that generates heat, and normal-temperature air comes into contact with the heat transfer member 104 from the other one of the lamps that is not turned on. Accordingly, the heat transfer member 104 is continuously cooled by the air with a relatively low temperature, and the air from the lamp that generates heat can be efficiently cooled.

As illustrated in FIGS. 1, 3A, and 3B, slits 112 are formed in the lamp boxes 110A and 110B at the exhaust side thereof. The slits 112 are openings formed in walls of the lamp boxes 110A and 110B. As illustrated in FIGS. 3A and 3B, side walls of the slits 112 are inclined toward the heat transfer member 104. Therefore, the air discharged from the lamps can easily flow toward the heat transfer member 104.

2. Operation of Embodiment

A method for cooling the lamps installed in the projector 100 according to the embodiment of the present invention will now be described with reference to FIGS. 1 to 4.

Since the projector 100 is of the two-lamp switching type, when the projector 100 is used, one of the lamps in the lamp boxes 110A and 110B is turned on. The lamp that is turned on generates heat. When the projector 100 is activated, operations of the air supply fans 106A and 106B and the exhaust fan 102 of the projector 100 are started.

The air supply fans 106A and 106B and the exhaust fan 102 operate so as to supply air to the lamp boxes 110A and 110B and discharge the air supplied to the lamp boxes 110A and 110B to the outside. Accordingly, one of the lamps that is turned on is cooled by the air flow. The air that passes by the lamp that is turned on is heated to a high temperature and is discharged from the lamp box 110A or 110B in a high-temperature state. The air that passes by the lamp that is not turned on is discharged from the lamp box 110A or 110B while the temperature thereof is maintained.

Parts of the air discharged from the lamp box 110A and the air discharged from the lamp box 110B come into contact with the heat transfer member 104. The heat transfer member 104 has a heat dissipation property, and is therefore capable of reducing the temperature of the air discharged from the lamp that is turned on and that generates heat. Since the normal-temperature air from the other lamp that is not turned on comes into contact with the heat transfer member 104, the heat transfer member 104 is continuously cooled by the air with a relatively low temperature. Therefore, the air from the lamp that generates heat can be efficiently cooled.

Then, the exhaust fan 102 mixes the air from the lamp box 110A and the air from the lamp box 110B, and discharges the mixed air to the outside of the projector 100. Since the high-temperature air and the low-temperature air are mixed, the temperature of the air discharged to the outside is reduced to a temperature close to the room temperature (normal temperature). Also when the lamp that is turned on and the lamp that is not turned on are switched in accordance with the operation of the projector 100, the same effect can be obtained.

As illustrated in FIGS. 5 and 6, in the two-lamp projector 10 according to the related art, the lamps are disposed symmetrically to each other with the illumination optical system 20 disposed therebetween. Since the lamp boxes 10A and 10B are separated from each other, the cooling system for the projector 10 is structured such that the lamp boxes 10A and 10B are provided with the respective exhaust fans 2A and 2B for cooling the lamps. Therefore, a large space is occupied by the exhaust fans 2A and 2B in the external housing of the projector 10.

In contrast, according to the present embodiment, the two lamp boxes 110A and 110B are disposed next to each other and a single exhaust fan 102 is provided. As a result, an integrated exhaust structure is provided in the projector 100 and the space occupied by the exhaust fan 102 in the external housing of the projector 100 is reduced. Since the number of exhaust fans is reduced, the manufacturing cost can be reduced. In addition, the overall size of the projector 100 can be reduced and the design freedom can be increased.

When a two-lamp switching type projector is used, one of the lamps is turned on and generates heat, and the other lamp is not turned on and does not generate heat. In the two-lamp switching type projector 10 according to the related art, the two exhaust fans 2A and 2B are provided for the respective lamps. Therefore, high-temperature air is discharged from one exhaust fan 2A (or 2B), and normal-temperature air is discharged from the other exhaust fan 2B (or 2A). Therefore, there is a case where high-temperature air, which is undesirable for the user and the external environment, is discharged.

The two-lamp switching type projector 100 according to the present embodiment is similar to the two-lamp switching type projector 10 according to the related art in that one of the lamps is turned on and generates heat and the other lamp is not turned on and does not generate heat when the projector 100 is used. However, according to the present embodiment, the air that has passed by the lamp that is turned on and generates heat and the air that has passed by the lamp that is not turned on are mixed and are discharged together from a single exhaust fan 102. Therefore, the temperature of the discharged cooling air can be reduced to a temperature close to the room temperature.

According to the related art, the air that has passed by the lamp that is not turned on is directly discharged, and one exhaust fan 2A (or 2B) is unnecessarily operated. In contrast, in the present embodiment, the exhaust fan 102 is not unnecessarily operated since the exhaust fan 102 sucks the air from the two lamps. In addition, according to the present embodiment, the air with a relatively low temperature (normal temperature) that has passed by the lamp that is not turned on can be used to cool the air that has passed by the lamp that is turned on and that generates heat.

Although the embodiment of the present invention is described in detail above with reference to the accompanying drawings, the present invention is not limited to the above-described embodiment.

For example, in the above-described embodiment, two lamp boxes and two lamps are provided in the projector. However, the present invention is not limited to this, and may also be applied to projectors including three or more lamp boxes and three or more lamps. In the case where, for example, three lamps are arranged next to each other, the exhaust fan may be disposed adjacent to the lamp at the center.

In addition, although the two-lamp switching type projector is explained in the above-described embodiment, the present invention can also be applied to projectors in which the lamps are simultaneously turned on to increase the brightness. In this case, high-temperature air is discharged from each of the lamps that are turned on. However, an integrated exhaust structure can be provided in the projector 100 and the space occupied by the exhaust fan 102 in the external housing of the projector can be reduced. In addition, the air discharged by the lamps can be cooled by the heat transfer member 104. Therefore, the temperature of the air discharged to the outside of the projector can be reduced.

The present application contains subject matter related to that disclosed in Japanese Priority Patent Application JP 2009-298941 filed in the Japan Patent Office on Dec. 28, 2009, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A projector comprising:
    a plurality of lamps serving as light sources, the lamps being arranged next to each other;
    a single exhaust fan disposed adjacent to the lamps, the exhaust fan discharging air around the lamps; and
    a heat transfer member disposed at an air discharge side of the lamps, air discharged from at least one of the lamps that is turned on and air discharged from at least one of the lamps that is not turned on coming into contact with the heat transfer member so that temperatures of the air discharged from the at least one of the lamps that is turned on and the air discharged from the at least one of the lamps that is not turned on are changed.

2. The projector according to claim 1, further comprising:
    box-shaped lamp boxes that accommodate the lamps,
    wherein the lamp boxes are provided with openings at the air discharge side of the lamps, the openings having side walls inclined toward the heat transfer member so that the air discharged from the lamps can easily flow toward the heat transfer member.

3. A method for cooling a plurality of lamps installed in a projector in which only one of the lamps is turned on, the lamps serving as light sources and being arranged next to each other, the method comprising the step of:
    mixing and discharging air around the lamp that is turned on and air around at least one of the lamps that is not turned on with a single exhaust fan disposed adjacent to the lamps; and
    changing temperatures of air discharged from the lamp that is turned on and air discharged from the at least one of the lamps that is not turned on by bringing the air discharged from the lamp that is turned on and the air discharged from the at least one of the lamps that is not turned on into contact with a heat transfer member disposed at an air discharge side of the lamps.

4. A method for cooling a plurality of lamps installed in a projector in which the lamps are turned on, the lamps serving as light sources and being arranged next to each other, the method comprising the step of:
    mixing and discharging air around each of the lamps that are turned on with a single exhaust fan disposed adjacent to the lamps; and
    changing temperatures of air discharged from the lamp that is turned on and air discharged from the at least one of the lamps that is not turned on by bringing the air discharged from the lamp that is turned on and the air discharged from the at least one of the lamps that is not turned on into contact with a heat transfer member disposed at an air discharge side of the lamps.

* * * * *